United States Patent [19]

Trelford

[11] Patent Number: 4,601,163
[45] Date of Patent: Jul. 22, 1986

[54] GARDEN TOOL

[75] Inventor: Alan Trelford, Fleet, England

[73] Assignee: Black & Decker Inc., Newark, Del.

[21] Appl. No.: 680,787

[22] Filed: Dec. 12, 1984

[30] Foreign Application Priority Data

Apr. 10, 1984 [GB] United Kingdom ............... 8409220

[51] Int. Cl.$^4$ ............................................. A01D 7/00
[52] U.S. Cl. ...................................... 56/16.7; 56/364; 56/362
[58] Field of Search ...................... 56/320.1, 320.2, 341, 56/16.7, 362, 17.5, 17.4, 364

[56] References Cited

U.S. PATENT DOCUMENTS

| 3,054,247 | 9/1962 | Roesler | 56/16.7 |
| 4,194,345 | 3/1980 | Pioch et al. | 56/17.5 |
| 4,211,058 | 7/1980 | Larsen | 56/320.1 |
| 4,232,505 | 11/1980 | Walto | 56/320.1 |
| 4,351,143 | 9/1982 | Lessig | 56/320.1 |
| 4,411,125 | 10/1983 | Strickland | 56/320.1 |
| 4,446,681 | 5/1984 | Dynie et al. | 56/16.7 |

FOREIGN PATENT DOCUMENTS

| 2519842 | 11/1976 | Fed. Rep. of Germany | 56/320.1 |
| 2024591 | 1/1980 | United Kingdom | 56/320.1 |
| 2083733 | 3/1982 | United Kingdom | 56/320.1 |

Primary Examiner—Gene Mancene
Assistant Examiner—John G. Weiss
Attorney, Agent, or Firm—Ronald B. Sherer; Edward D. Murphy; Harold Weinstein

[57] ABSTRACT

A motor driven lawn scarifier or cutter has a body which houses the motor and the scarifying/cutter assembly and also wheel or roller mountings. With a view to simplifying manufacture and assembly of the tool and eliminating corrosion problems, the body is moulded in one piece from plastics material and is shaped to provide a chamber (34) for the motor (50) and a forward chamber for the scarifying/cutter assembly (4). A roller (6A), located in a rearward chamber in the body, is mounted in openings (23) in the sides of the body and wheels (5) are mounted in openings (24) at the front of the body. A cover (8) which is also moulded in one piece from plastics material closes the motor chamber (34).

13 Claims, 12 Drawing Figures

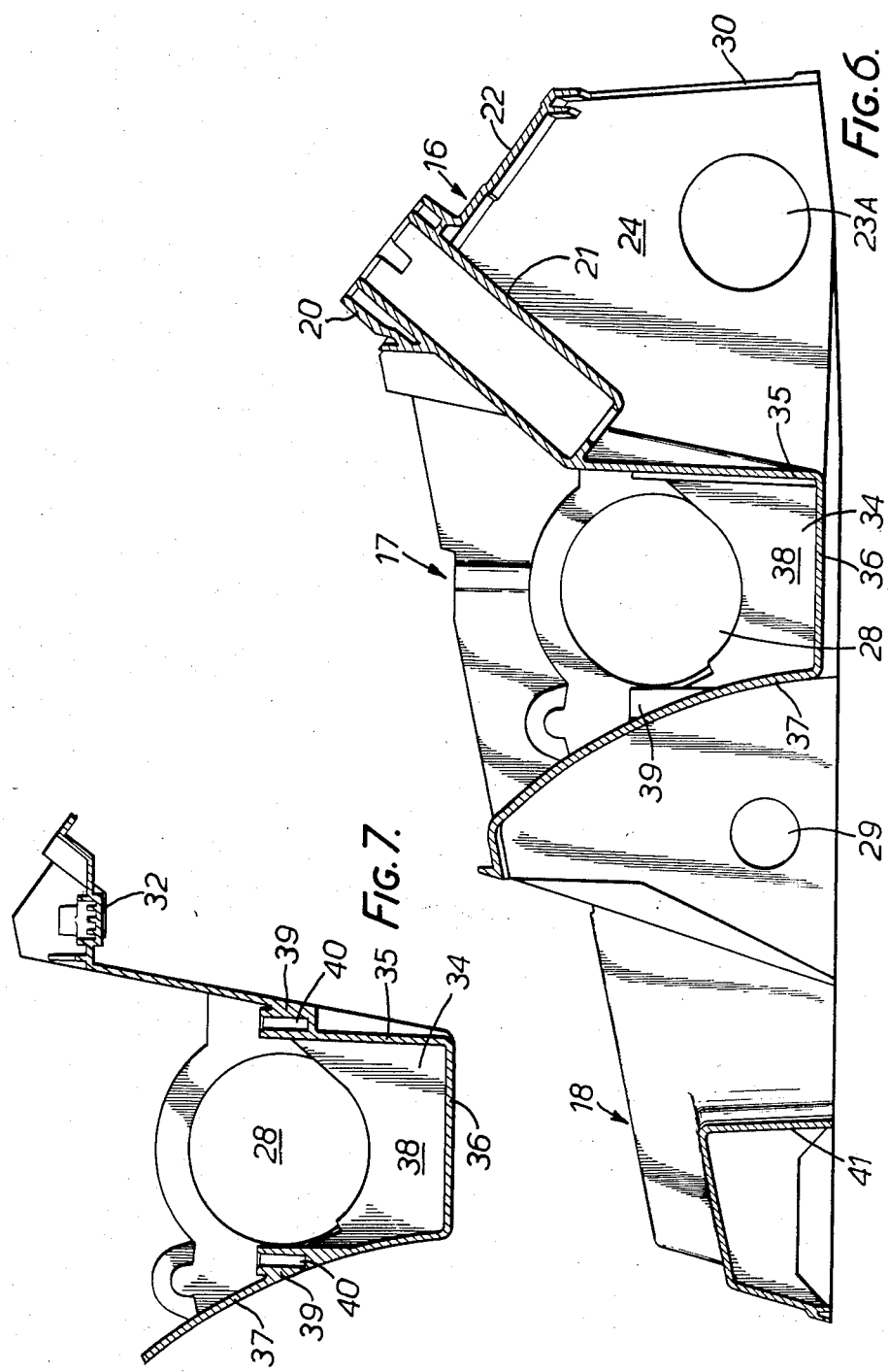

GARDEN TOOL

BACKGROUND OF THE INVENTION

1. Field of the Invention

This invention relates to a garden tool having a ground engaging member (for example a tine assembly or a cutter assembly) driven by a motor. The invention is particularly concerned with scarifying or raking tools and with grass cutters.

2. Brief Description of the Prior Art

In an existing form of scarifier, the body of the tool is made of a number of metal parts assembled together. In this way, a strong body can be obtained and a compartment for a motor, wheel or roller mountings and other facilities provided on the body without undue difficulty. Such a construction is, however, expensive and also liable to corrode.

SUMMARY OF THE INVENTION

According to the invention, there is provided a garden tool including a body moulded in one piece from plastics material, the body defining a chamber for receiving a driving motor, and a forward chamber for receiving a scarifying, raking or cutter assembly.

By making the body in one piece from plastics material, considerable cost savings are achieved and corrosion problems are eliminated.

Preferably, the chamber for receiving the motor and defined by the tool body is upwardly open.

A cover may be provided to fit over the top of the motor chamber thereby closing the chamber. This protects the motor from dirt and also protects an operator against accidental contact with the motor. The cover is preferably also moulded in one piece from plastics material.

A pair of wheels or a roller may be mounted at the front and/or the back of the body. In one embodiment of the invention, a rear roller is provided below the top of the body in a rearward chamber defined in the body.

The wheels or roller may be mounted in openings in the sides of the body.

A speed reducing gear box may be drivingly connected between the motor and the scarifying, raking or cutter assembly. The motor and the speed reducing gear box may together define a sub-assembly. The gear box of the sub-assembly may be located outside a side of the body and the motor may project through the side of the body into the chamber. The gear box may be located in an enclosed space defined between the side of the body and a side portion of the cover. The side portion of the cover may include one or more openings providing an air passageway from the enclosed space to the exterior of the tool. A further air passageway may be provided from the exterior of the tool into the chamber.

A handle may be mounted on the body. The handle may be mounted at the rear of the tool.

Other objects, features and advantages of the present invention will become more fully apparent from the following detailed description of the preferred embodiment, the appended claims and the accompanying drawings.

BRIEF DESCRIPTION OF THE DRAWINGS

By way of example, a lawn mower scarifier embodying the invention will now be described with reference to the accompanying drawings, of which:

FIG. 6 is a sectional view along the lines VI—VI of FIG. 4,

FIG. 7 is a sectional view along the lines VII—VII of FIG. 4,

DETAILED DESCRIPTION OF THE PREFERRED EMBODIMENT

Figure 1:
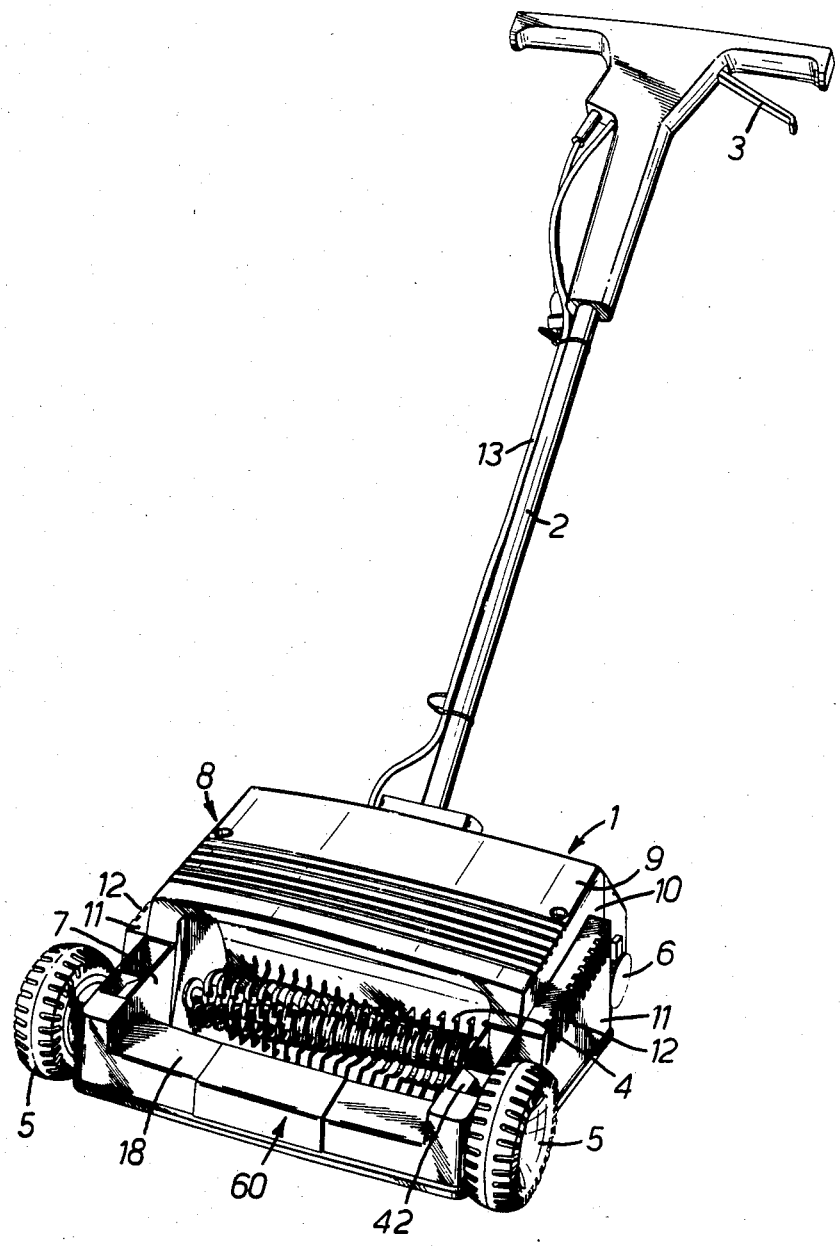
FIG. 1 is a perspective view of the lawn scarifier.
Figure 2:
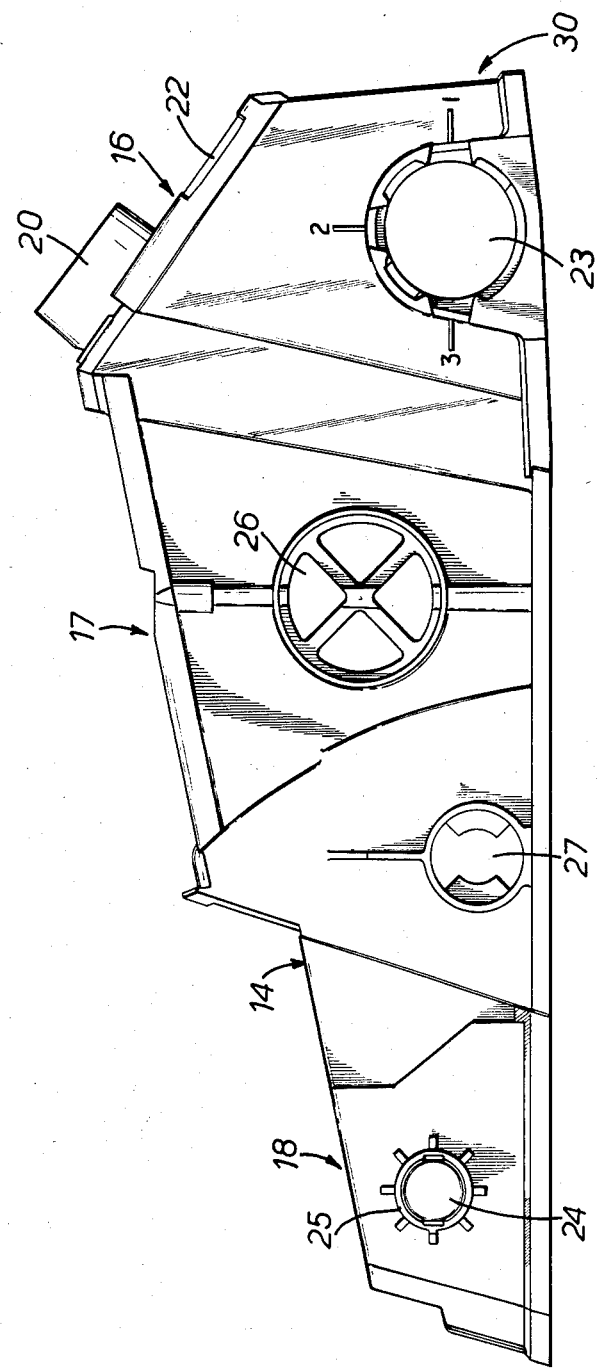
FIG. 2 is a side view of one side of the main body of the scarifier.
Figure 3:
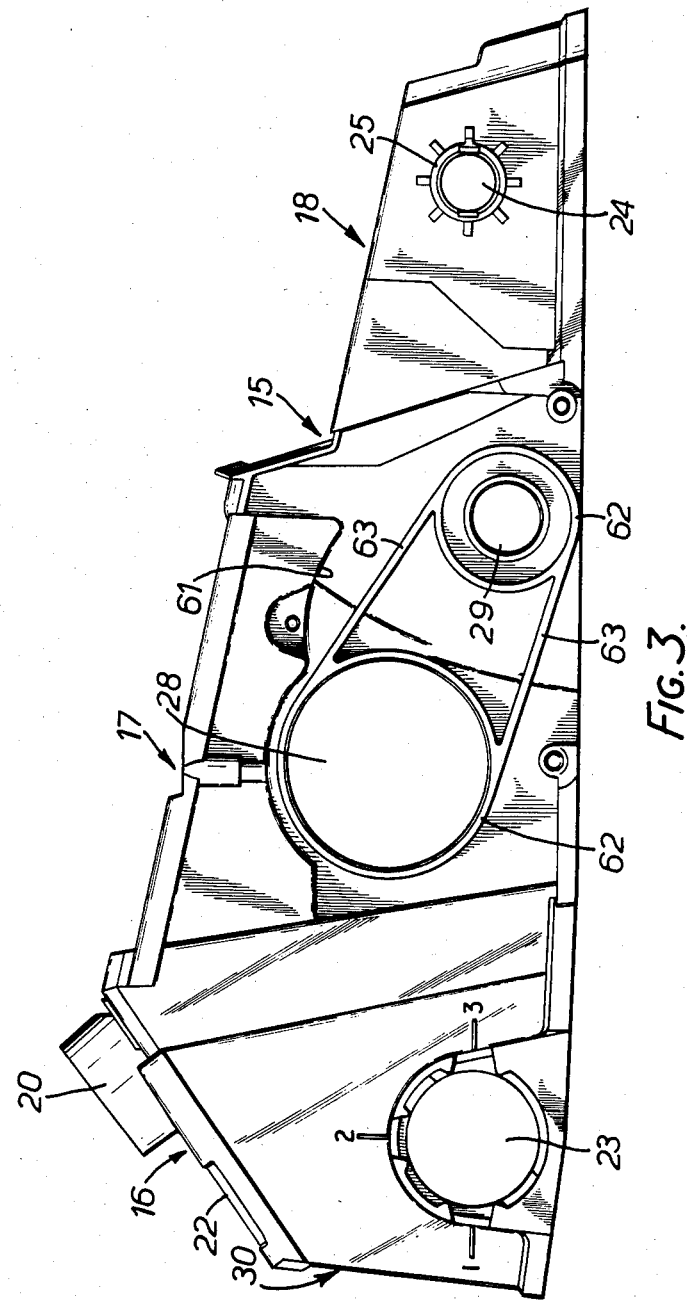
FIG. 3 is a side view of the other side of the main body.
Figure 4:
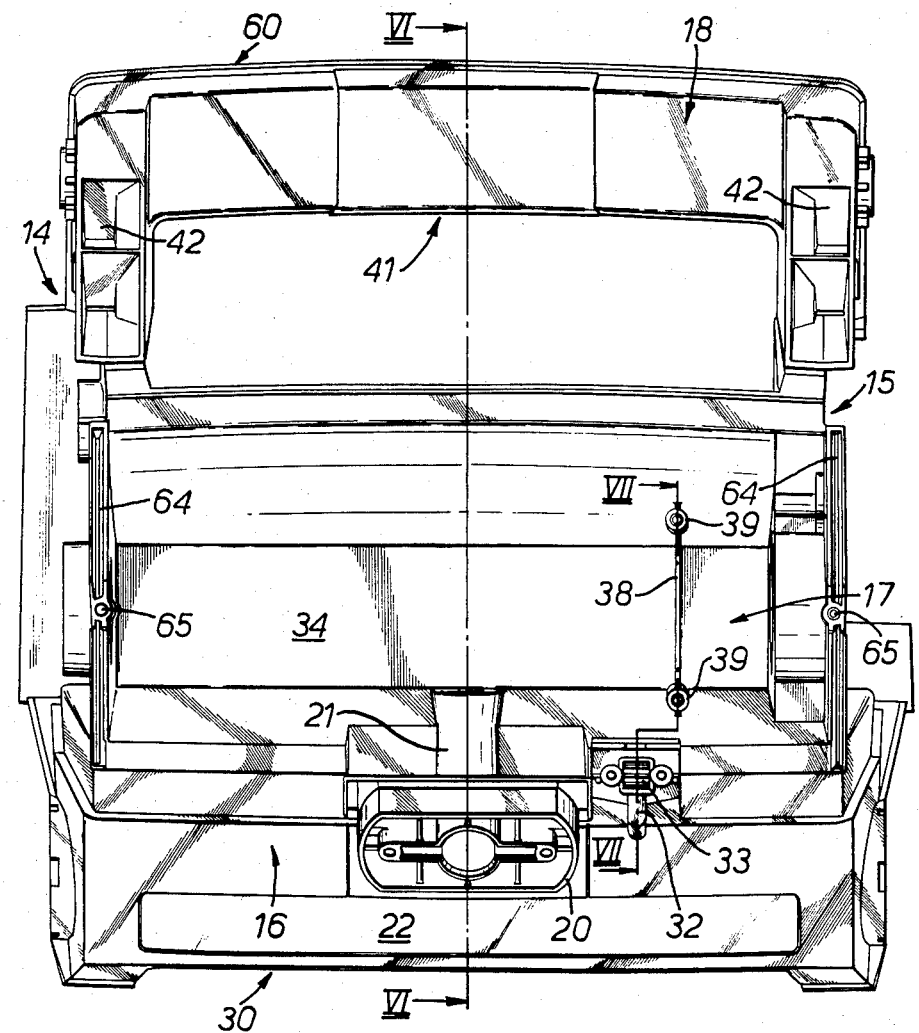
FIG. 4 is a top plan view of the main body.
Figure 5:
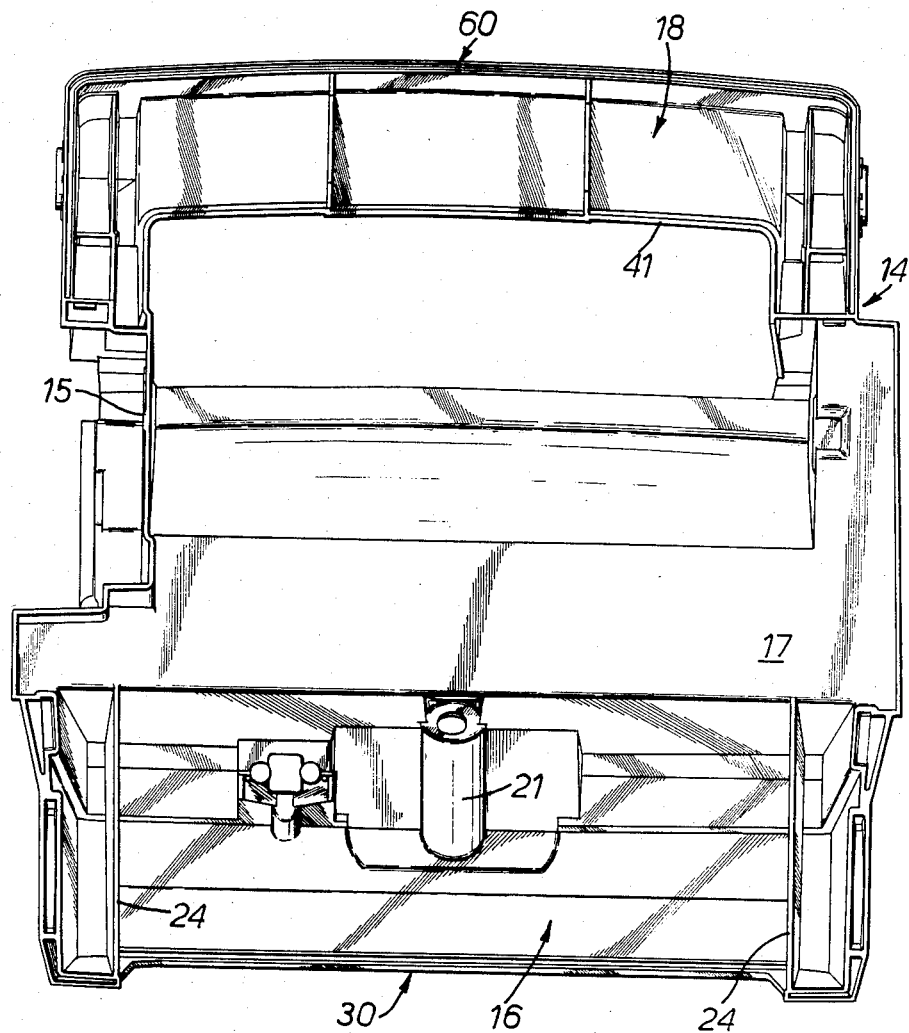
FIG. 5 is an underneath plan view of the main body.
Figure 12:
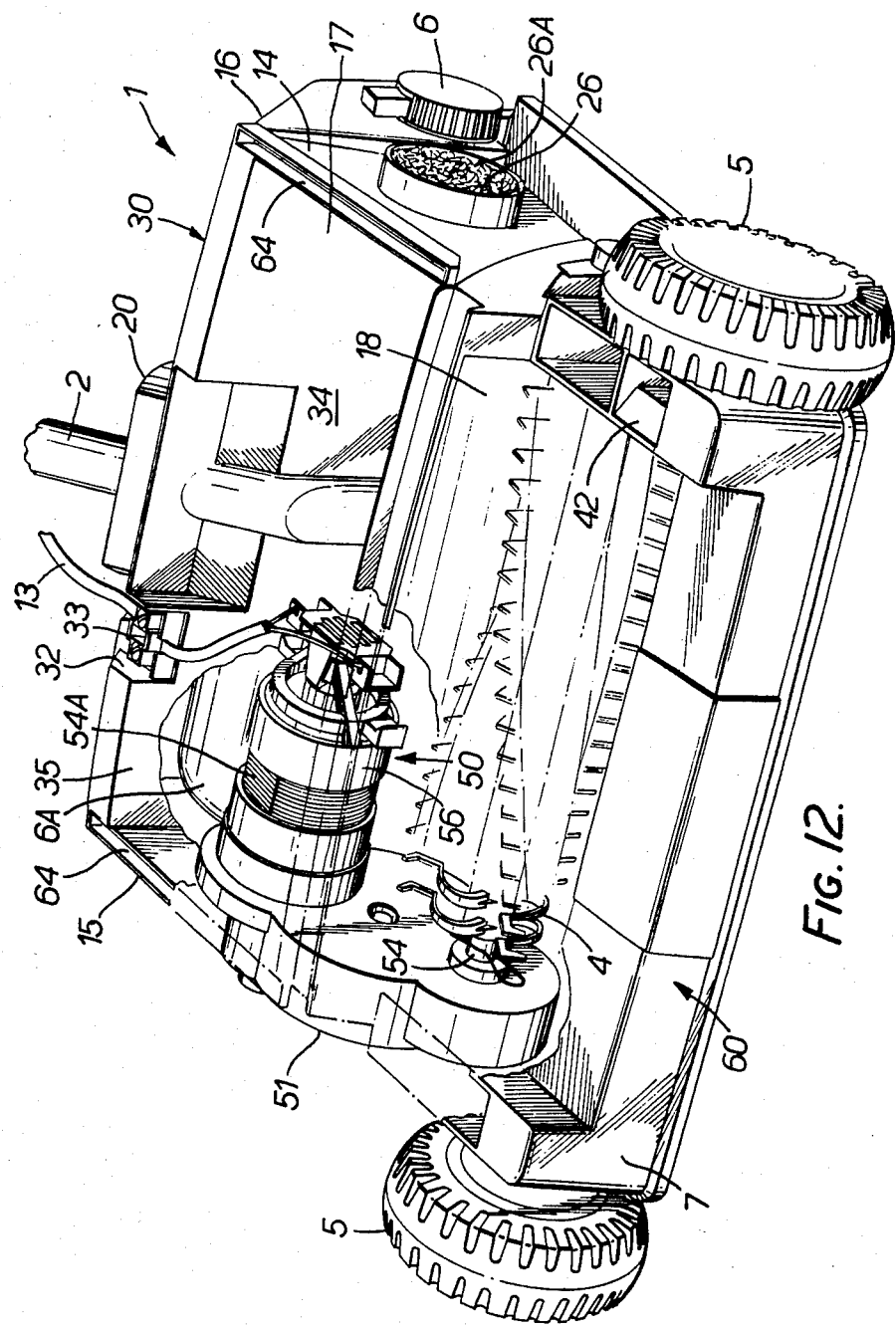
FIG. 12 is a view, similar to FIG. 1 of the main body of the scarifier, partly brokenaway and with the cover removed.

Referring first to FIG. 1, a lawn scarifier has a body 1, a handle 2, with a control switch (not shown) but operable by a pivoted lever 3, and a tine assembly 4 rotated in use by a motor and gear box assembly (not visible in FIG. 1 but shown in FIG. 12). The scarifier is supported on a pair of front wheels 5 rotatably mounted on the body 1 and a rear roller 6A (not visible in FIG. 1 but shown in FIG. 12), the height of which may be adjusted by rotating a pair of knobs 6. An electric cable 13 leads from the switch 3 down the handle to the body 1 of the tool. The tine assembly may be as described in British patent application No. 82.36612 (publication No. 2 112 613A) or European patent application No. 80104985.9 (publication No. 0 024 696).

The body 1 comprises a main body 7 and a cover of inverted ⊔-shape and which has a grooved top portion 9 and 10 depending from the top portion and extending down to the bottom of the body 1. Each of the sides 10 includes an enlarged box part 11 having air vents 12 providing an air passage between the interior of the body 1 and the outside atmosphere.

The main body 7 and the cover 8 are each moulded in one piece from plastics material. The shape of the main body 7 will now be described in further detail with reference to FIGS. 1 to 7 and that of the cover 8 with reference to FIGS. 10 and 11.

The main body 7 has a front 60, a back 30, similar but not identical sides 14, 15 (the side 14 being shown in FIG. 2 and the side 15 in FIG. 3), and a top which can be divided into three parts: a rear part 16, an upwardly-open central part 17 and a front part 18. The front and central parts are shallowly inclined towards the front of the scarifier while the rear part is more steeply inclined towards the rear of the scarifier. The bottom of the body 7 is open (this being the route by which the main core of the mould is inserted and withdrawn), while the other sides of the body are in general solid, apart from the front part 18 of the top which has an opening in which the tine assembly 4 is mounted and the back 30 which is cut away along much of its length to accommodate the roller.

Each of the sides 14, 15 has a substantially circular opening 23 towards the rear in which a respective one of the height adjustment knobs 6 for the rear roller is mounted. As can be seen from FIG. 5, a respective interior side wall 24 is provided parallel to each of the sides 14, 15 at the rear of the main body and each interior wall has an opening 23A (FIG. 6) aligned with the openings 23 and providing a second mounting of the knob 6. The details of the height adjustable rear roller mounting are not relevant to the present invention and will not be described further. The mounting is described in pending British Patent Application No. 84.24499 (publication No. 2147185A).

Towards the front of each side 14, 15 a respective circular opening 24 surrounded by an outstanding boss 25 is provided to receive a respective stub axle for a respective one of the wheels 5.

On each of the sides 14, 15 there are two further generally circular openings which are coaxial with one another. On the side 14, there is an opening 26 which is located below the central part 17 of the top of the main body and there is an opening 27 coaxial with the tine assembly 4. An air filter 26A (in FIG. 12) is mounted in the opening 26 and a bearing (not shown) for the tine assembly is releasably mounted in the opening 27. The details of the bearing mounting are not relevant to the present invention and will not be described further.

Figure 9:
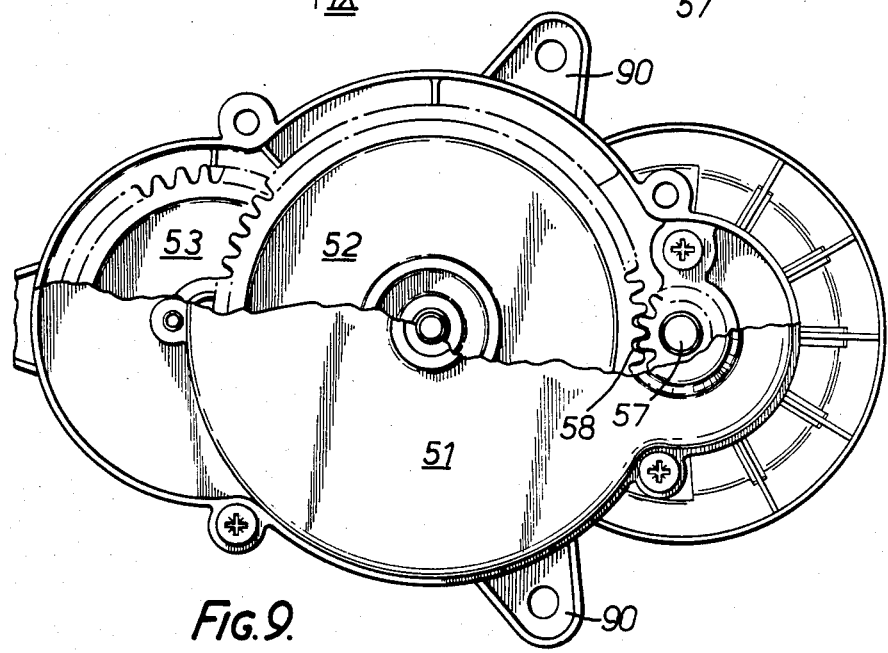
FIG. 9 is a partly cut away end view of the motor and gear box assembly, in the direction of the arrow IX in FIG. 8.

On the side 15, there is a circular opening 28 coaxial with the opening 26 in which a part of the motor and gear box assembly shown in FIG. 9 is received as will be described in more detail later, and there is a circular opening 29 coaxial with the opening 27 through which the output drive shaft of the motor and gear box assembly passes from the exterior to the interior of the main body 7, as will be described below.

In the centre of the inclined rear part 16 a generally rectangular projecting housing 20 is provided with a central tubular portion 21 in which the handle 2 is mounted. The details of this handle mounting arrangement are not relevant to the present invention and will not be described further. Immediately below the housing 20 is a slightly recessed panel 22 on which the manufacturer's label or nameplate may be fixed.

Adjacent to the housing 20 at the top of the rear part 16, a groove 32 is formed in the body providing a passageway into a motor chamber 34 defined by the upwardly open part 17 of the main body and below the cover 8. The cable 13 from the switch 3 passes through this passageway and a cable clamp 33 is provided in the motor chamber 34 where the cable enters the chamber. The motor chamber 34 extends across substantially the entire width of the tool and has a rear wall 35 with an upper sloping portion and a lower upright portion, a bottom wall 36 and a curved front wall 37. Towards the side 15 a transverse wall 38 with an arcuate top (see FIGS. 6 and 7) is provided between walls 35 and 37 and at each end of the wall 38 there are bosses 39 with threaded bores 40.

The curved front wall 37 of the motor chamber 34 also defines the rearward boundary of the opening at the front of the tool for the tine assembly 4. The forward boundary of this opening is defined by a vertical wall 41 depending from the front part 18 of the top of the main body. On each side of the front part 18, sockets 42 are provided to receive mounting parts of a collector box (not shown).

Figure 8:
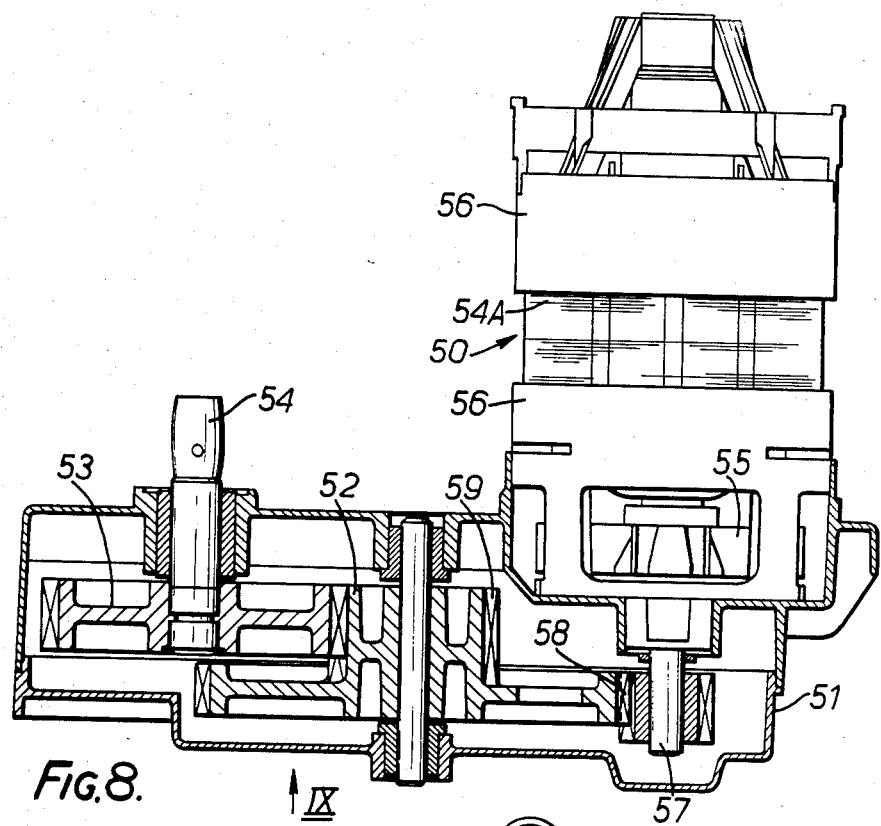
FIG. 8 is an underneath plan view, partly in section of a motor and gear box assembly which is received in the main body.

Referring now also to FIGS. 8 and 9, the motor and gear box assembly generally comprises an electric motor 50, a gear box housing 51, gears 52 and 53 and an output drive shaft 54. The motor 50 is fixed to the gear box housing 51, which is made in two mating parts, and includes a lamination stack 54A, a centrifugal fan 55 and end caps 56. The armature shaft of the motor carries a pinion 57 at one end projecting into the gear box housing 51 and the pinion 57 meshes with teeth 58 formed on a large diameter of the gear 52 which is mounted on a long shaft in the housing. The gear 52 also has a set of teeth 59 meshing with teeth on the gear 53 which is fixed to the output drive shaft 54 passing out through the gear box housing 51 parallel to the motor armature shaft.

As shown in FIG. 12, the motor and gear box assembly is mounted on the main body 7 of the tool with the motor inserted into the motor chamber 34 through the opening 28 and the output drive shaft 54 passing through the opening 29 in the side 15 and drivingly connected to the tine assembly 4. The gear box housing 51 is located outside the side 15 immediately adjacent thereto and the side 15 is stepped inwardly below a curved boundry wall 61 (FIG. 3) to accommodate the housing 51. The side 15 is strengthened in the region of the openings 28 and 29 by circular ribs 62 around the openings and interconnecting tangential ribs 63. Holes are provided in lugs 90 on the gear box housing 51 and in corresponding locations in the side 15 to enable the motor and gear box assembly to be secured in position.

The motor 50 rests on the arcuate top of the transverse wall 38 in the motor chamber and the electric cable 13 is connected to the motor.

Figure 10:
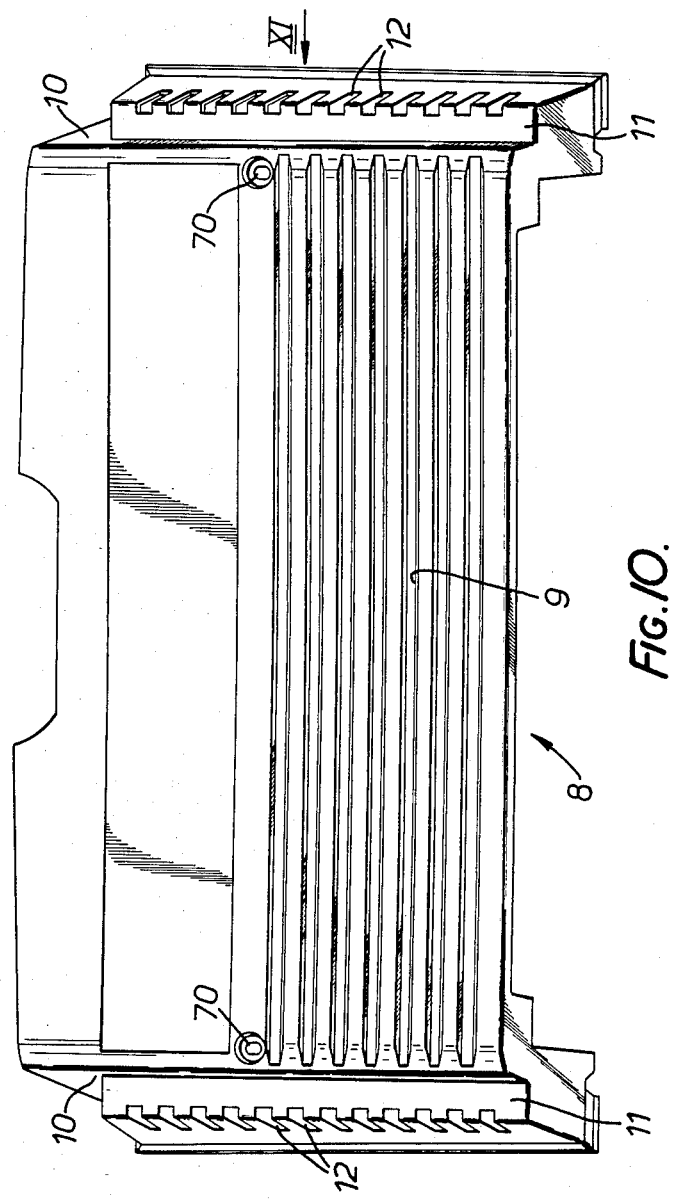
FIG. 10 is a plan view of a cover for the main body.
Figure 11:
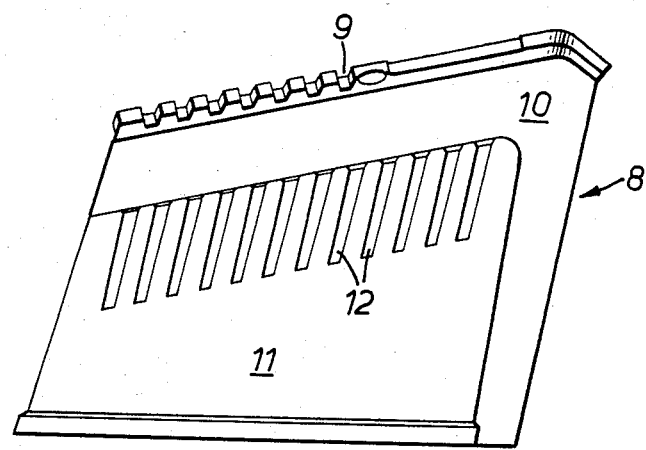
FIG. 11 is a side view of the cover, taken in the direction of the arrow XI in FIG. 10.

When the motor 50 is in position, the cover 8 shown in FIGS. 10 and 11 is secured over the hollow central part 17 of the main body. The cover 8 locates in grooves 64 provided in the tops of the sides 14,15 and is secured in position by screws secured in holes 65 in the sides 14,15 and holes 70 in the cover 8.

When a user closes the switch 3, the motor 50 is actuated rotating the tine assembly 4 via the gears 52,53. The fan 55 draws air in through the vents 12 of the cover 8 over the side 14, through the air filter 26A in the side 14 and into the motor chamber 34. Air is discharged by the fan into the space between the cover 8 and the side 15 of the body and passes out of the tool through the vents 12 on that side of the cover.

The main body 7 of the scarifier described above, being moulded in one piece from plastics material, is comparatively simple and inexpensive to produce, and the use of plastics material results in a main body 7 which is comparatively lightweight and will not corrode, so that the scarifier is easy to handle and is also easy to maintain.

The structure of the main body 7 (in particular, the provision of the various walls defining the motor chamber and the tine assembly chamber) ensures that the body is sufficiently robust despite its lightweight. Moreover, assembly of the scarifier is faciliated since the structure provides, in a simple manner, a location for the various components of the scarifier including, in particular, a compartment 34 in which the motor can be completely enclosed by the provision of the cover 8 and thereby protected.

What is claimed is:
1. A garden tool, comprising:
   a body molded in one piece from plastics material, the body having two sides, a front part, a middle part, and a rear part;

an electric motor received in a motor chamber defined in said middle part;
a ground engaging assembly rotatably mounted in said front part;
rear means, rotatably mounted in said rear part, for supporting said body;
front means, rotatably mounted on said front part, for supporting said body;
said front part having a curved back wall which is upwardly forwardly inclined, and an upright wall spaced forwardly of said curved wall, said curved wall and said upright wall defining a space therebetween in which said ground engaging assembly is disposed;
said middle part having a bottom wall from which upwardly extend said curved wall and a rear wall spaced rearwardly thereof to define said motor chamber which is upwardly open;
said curved wall and said rear wall being connected by said sides;
a cover fitted over the top of the motor chamber thereby closing the latter, said cover having two downwardly depending side sections extending outside said sides;
said rear part having a top wall and an open bottom;
a socket extending downwardly from the top wall of said rear part and being connected to said rear wall;
a handle having a portion engaged in said socket;
said motor having one end engaged in an opening in one of said sides;
a gear box connected between said one end of said motor and said ground engaging assembly and being located in an enclosed space defined between said one of said sides and one of said side sections of said cover;
air openings in said side sections of said cover; and
an air opening in the other of said sides communicating with said motor compartment.

2. The garden tool of claim 1, further comprising an internal wall extending across said motor compartment between said curved and rear walls, said internal wall having an arcuate top upon which said motor rests.

3. The garden tool of claim 2, wherein said air opening in said other side is provided with an air filter.

4. The garden tool of claim 1, wherein said front means comprises a pair of wheels mounted one on each side of said front part, and said rear part has a cutaway back wall to accommodate said rear means.

5. The garden tool of claim 1, wherein other than said bottom wall of said middle part, the bottom of said molded body is open.

6. The garden tool of claim 1, wherein said ground engaging assembly comprises a tine assembly.

7. A garden tool, comprising:
a body molded in one piece from plastics material and having side walls extending in a lengthwise direction of the garden tool;
said body having front, middle, and rear compartments with a curved transverse wall separating said front and middle compartments and a rear transverse wall separating said middle and rear compartments, said transverse walls extending between said side walls;
said front compartment having a front wall and being open top and bottom;
a ground engaging assembly rotatably mounted in said front compartment with a rotational axis thereof parallel to said transverse walls;
said middle compartment being defined between said transverse walls, being closed underneath by a bottom wall extending between said transverse walls, and having an open top;
an internal wall extending between said transverse walls, having a curved top, and being spaced between said side walls;
an electric motor mounted in said middle compartment and being supported on said curved top with one end of said motor engaging in an opening in one of said side walls;
a gearbox drivingly connecting said motor to said ground engaging assembly and being located outside said one of said side walls;
said rear compartment having a top wall and an open bottom;
a handle connected to said body and extending upwardly and rearwardly therefrom;
a cover extending over and closing said open top of said middle compartment, said cover having a downwardly depending side wall enclosing said gear box in a space between said cover side wall and said one side wall of said body; and
means for drawing air into said middle compartment and for discharging air therefrom.

8. The garden tool of claim 7, wherein:
said cover has a second downwardly depending side wall extending over the other of said body side walls;
said second cover side wall has air vents therethrough communicating with an air filter disposed across an opening in said other body side wall; and
said means comprises a fan of said motor, said fan drawing air in through said air vents and said filter and discharging the air into said space in which said gearbox is enclosed, the air exiting from said space through further air vents in said cover.

9. The garden tool of claim 7, further comprising:
a pair of front wheels rotatably mounted on said body outside said front compartment;
a roller rotatably mounted inside said rear compartment, a rear wall of said rear compartment being cut away to accommodate said roller; and
a socket in said body extending from said top wall of said rear compartment downwardly to said transverse wall between said rear and middle compartments, said handle being engaged in said socket.

10. The garden tool of claim 7, wherein said ground engaging assembly comprises a tine assembly.

11. The garden tool of claim 7, wherein said body has an open bottom except for said bottom wall of said middle compartment; and said motor and said gearbox jointly form a sub-assembly having an output shaft parallel to an armature shaft of the motor, the motor and the output shaft extending from one side of said sub-assembly.

12. A garden tool, comprising:
a body molded in one piece from plastics material and having two side walls extending in a lengthwise direction of the garden tool;
said body having front, middle, and rear compartments with a curved transverse wall separating said front and middle compartments and a rear transverse wall separating said middle and rear compartments, said transverse walls extending between said side walls;
said front compartment having a transverse member spaced forwardly of said curved transverse wall and extending between said side walls, said front compartment being open top and bottom;

a ground engaging assembly rotatably mounted in said front compartment with a rotational axis thereof parallel to said curved transverse wall;

wheels rotatably mounted at the front of said body for supporting said garden tool;

said middle compartment having an open top and being closed at the bottom by a bottom wall extending between and integral with bottom portions of said transverse walls;

an electric motor supported in said middle compartment with one end of said motor engaged in a motor opening in one of said side walls, said motor having a fan for circulating air;

a filter opening in the other of said side walls, said filter opening being provided with an air filter;

a cover fitted over the top of said middle compartment thereby enclosing said motor in said middle compartment;

said cover having two depending side sections extending downwardly outside said side walls, said side sections having air vents therein;

a gearbox drivingly connecting said motor to said ground engaging assembly and being located outside said one side wall, said gearbox being enclosed in a space defined between said one side wall and one of said side sections of said cover;

said gearbox comprising a plurality of gears enclosed in a gearbox housing, one end of said bearbox housing being connected to said one end of said motor, and another end of said gearbox housing having an output drive shaft extending therefrom into said front compartment;

said rear compartment having an upper wall integrally connected to said side walls, and an open bottom, said upper wall extending downwardly and rearwardly from a top portion of said rear transverse wall;

rear support means, associated with said rear compartment and rotatably mounted to said body, for supporting said garden tool in conjunction with said wheels;

a socket formed in said body and extending upwardly and rearwardly from said rear transverse wall through said upper wall of said rear compartment, said socket being integral with said rear transverse wall and said upper wall;

a handle engaged in said socket and extending upwardly and rearwardly from said body; and said air vents, said air filter, said middle compartment and said space in which said gearbox is enclosed defining a path for air circulated through said motor by said fan, said path extending between said air vents.

13. The garden tool of claim 12, wherein:

said rear support means comprises a roller mounted inside said rear compartment;

said rear compartment has a back wall extending transversely between said side walls and extending downwardly from said upper wall, said back wall being cut away to accommodate said roller;

said middle compartment has a partition extending between said curved and rear transverse walls at a location spaced between said side walls, said partition having an arcuate top on which said motor rests;

said socket is disposed intermediate said side walls;

said motor and said gearbox jointly form a sub-assembly with said output shaft parallel to an armature shaft of said motor;

said plurality of gears comprise a first gear on said armature shaft, second and third gears rotatably mounted on a common intermediate shaft in said gearbox housing, and a fourth gear mounted on said output shaft;

said fan is mounted on said armature shaft;

said ground engaging assembly comprises a tine assembly; and said cover side sections extend to the bottom of said body and include enlarged box parts in which said vents are located.

* * * * *